June 25, 1940. H. J. DE N. McCOLLUM ET AL Re. 21,491
VACUUM POWER CLUTCH
Original Filed Dec. 20, 1930 3 Sheets-Sheet 1
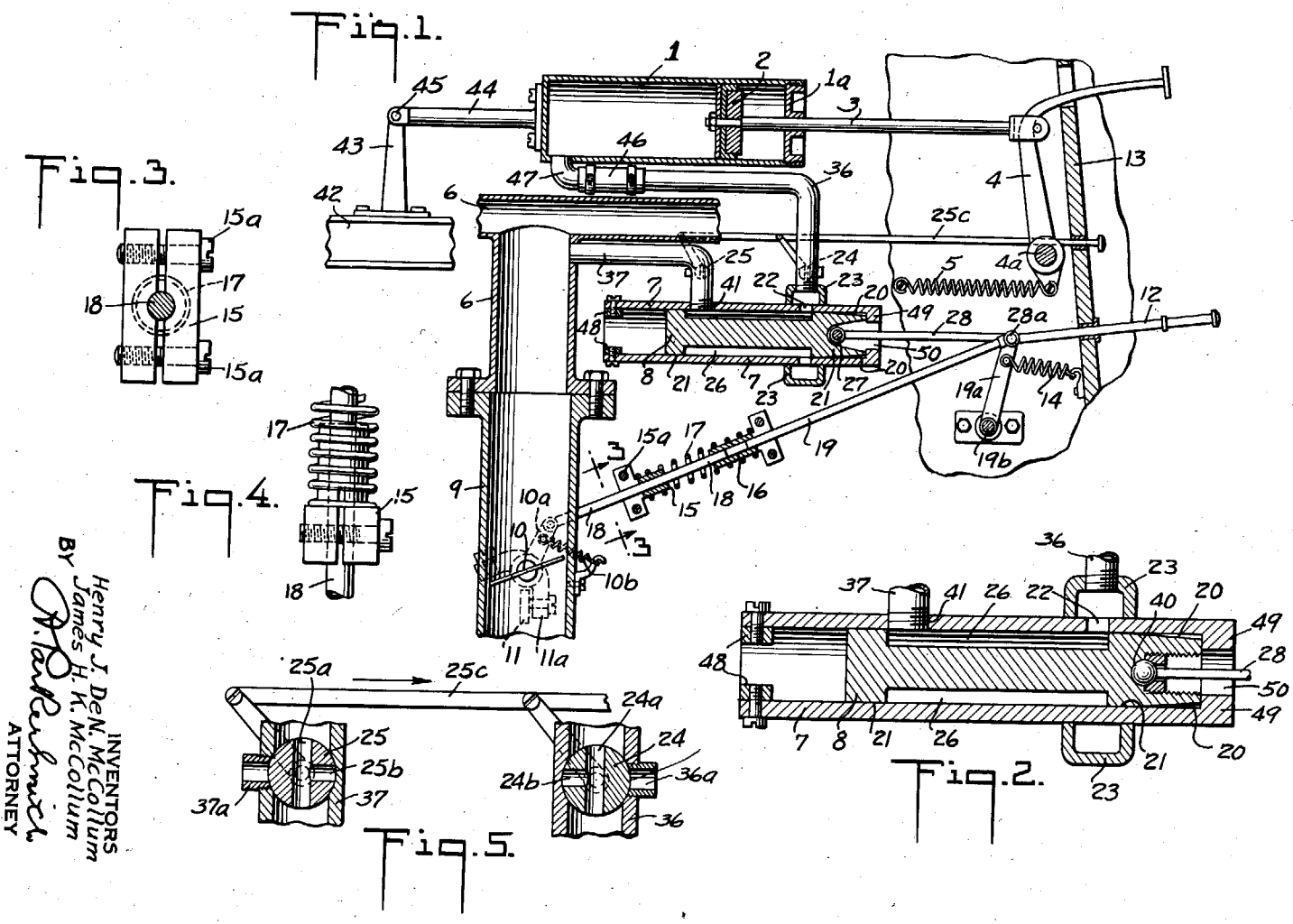
INVENTORS
Henry J. DeN. McCollum
James H. K. McCollum
BY R. Parkerhurst
ATTORNEY June 25, 1940. H. J. DE N. McCOLLUM ET AL Re. 21,491

VACUUM POWER CLUTCH

Original Filed Dec. 20, 1930 3 Sheets-Sheet 2

INVENTORS
Henry J. De N. McCollum
James H. K. McCollum
BY A. Parker Smith
ATTORNEY June 25, 1940. H. J. DE N. McCOLLUM ET AL Re. 21,491

VACUUM POWER CLUTCH

Original Filed Dec. 20, 1930 3 Sheets-Sheet 3

INVENTORS
Henry J. De N. McCollum
James H. K. McCollum
BY
ATTORNEY

Reissued June 25, 1940

Re. 21,491

UNITED STATES PATENT OFFICE 21,491

VACUUM POWER CLUTCH

Henry John De Neville McCollum and James Harry Keighley McCollum, Long Branch, N. J.

Original No. 1,858,999, dated May 17, 1932, Serial No. 503,767, December 20, 1930. Application for reissue August 4, 1933, Serial No. 683,698

27 Claims. (Cl. 192—.01)

Our invention relates generally to improvements in power operated clutches for motor cars and the objects of our improvements are, first, to provide a mechanism which automatically engages and disengages the clutch, second, to provide a mechanism which automatically causes the automobile, or motor vehicle to coast, or free-wheel whenever the foot pressure is completely removed from the accelerator by then disengaging, or opening, the clutch, but which will cause the clutch to engage, or close, during the initial movement of the accelerator pedal produced by the usual foot pressure, and before the carburetor throttle is opened from idling position. Conversely, while the foot pressure is being gradually removed from the accelerator pedal the clutch will remain in engagement after the throttle has been closed to idling position and so continue until said pedal has practically reached the limit of its upward or backward movement.

More specifically the present invention supplies a means for more accurately graduating and controlling the action of the automatic mechanism when closing the clutch, such nicely graduated control being necessary to prevent jerks in the movements of the vehicle and shocks to the mechanism, which might result from a too rapid and sudden complete engagement between the members of the usual friction clutch used in motor cars to which our invention may be applied.

We attain these objects by the mechanism illustrated in the accompanying three sheets of drawings in which like numbers represent the same parts in the various figures.

Fig. 1 is a diagrammatic view, with parts broken away, and others shown in section, of one form of apparatus embodying the invention as attached to the power transmission clutch pedal, carburetor throttle and intake manifold of a motor car, a single acting cylinder and piston being shown.

Fig. 2 is an enlarged, sectional view of the same form of fluid pressure controlling valve, with a ball and socket operating connection thereto.

Fig. 3 is a detail cross section on line 3—3 of Fig. 1.

Fig. 4 is a detail, side view of the parts shown in Fig. 3.

Fig. 5 is a detail sectional view on an enlarged scale of the twin cut-out valves indicated in Fig. 1.

Figure 8:
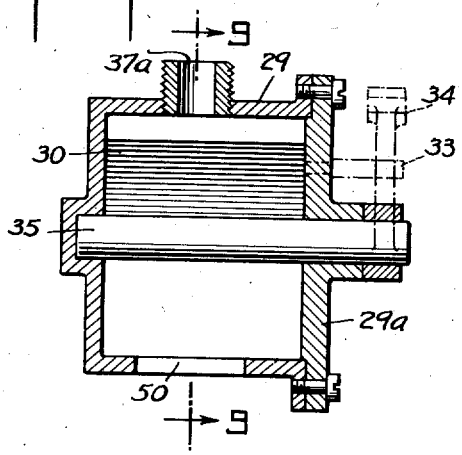
Figure 9:
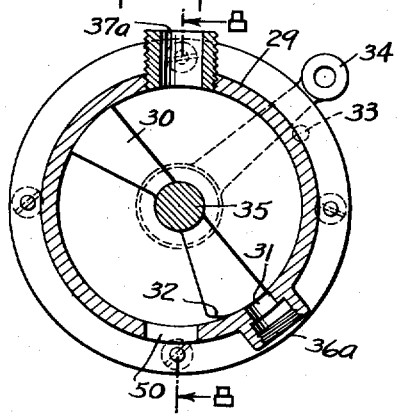

Fig. 8 is a detail section on line 8—8 of Fig. 9, and Fig. 9 is a section on line 9—9 of Fig. 8, showing a butterfly valve which may be substituted for the plug valve shown in Figs. 1 and 2.

Figures 6, 12:
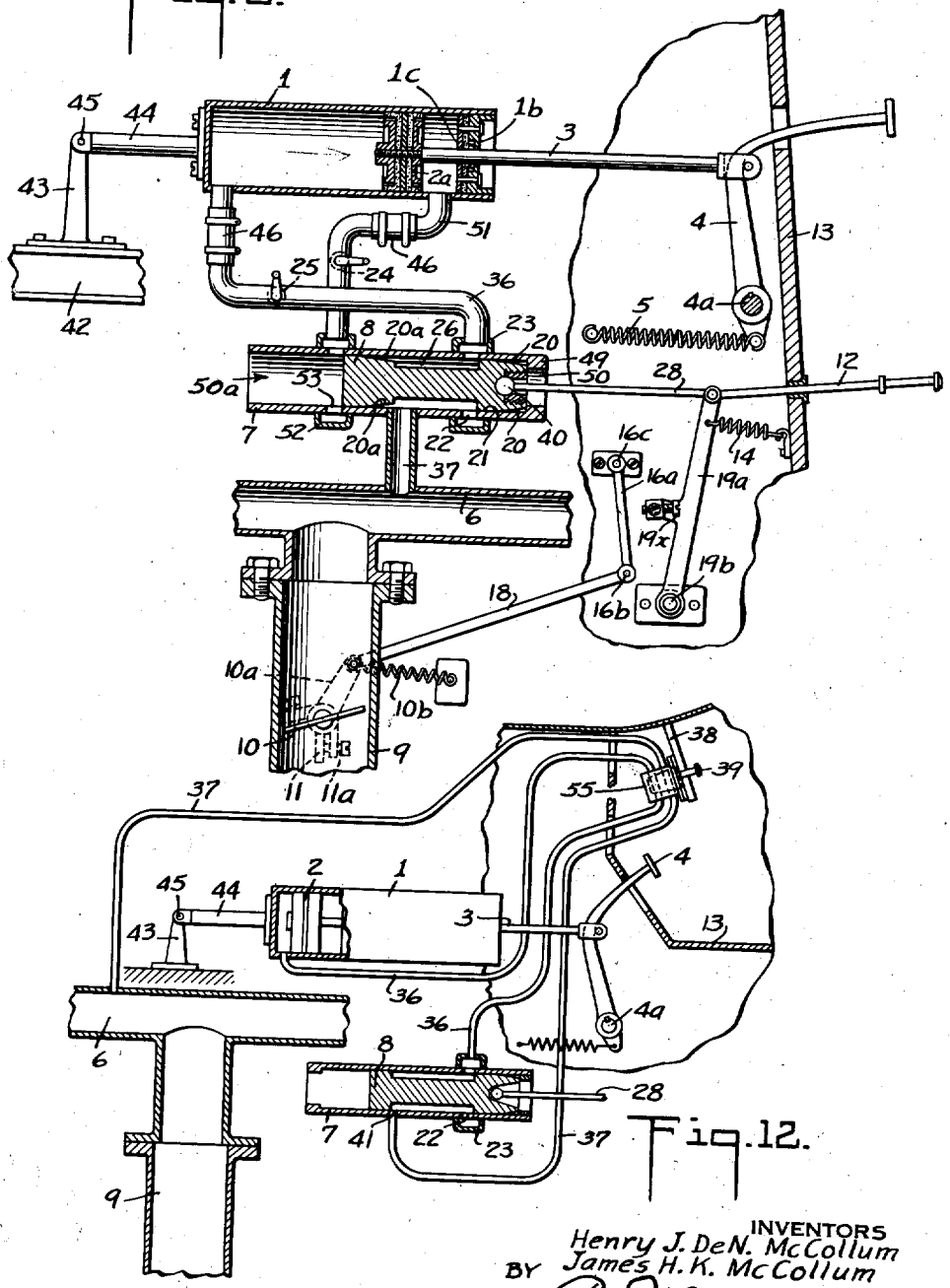
Fig. 6 is a view similar to Fig. 1 showing a modification in which the clutch operating cylinder and piston are double-acting.
Fig. 12 is a diagram showing its connections to other parts of the apparatus.
Figure 10:
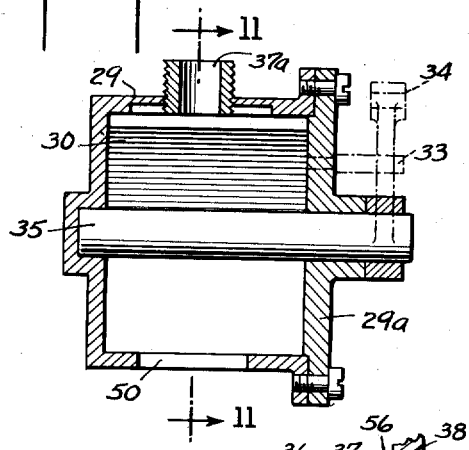
Figure 11:
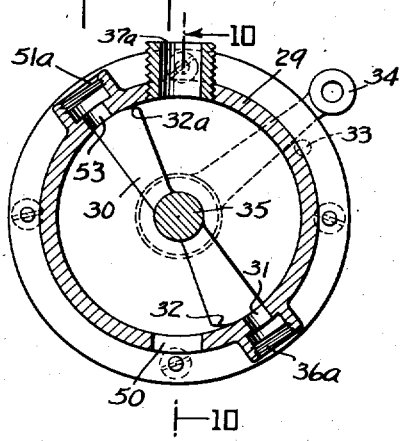

Figs. 10 and 11 are similar views of such a valve for use in connection with the double acting cylinder and piston of Fig. 6.

Throughout the drawings like reference characters indicate like parts.

Fig. 1 illustrates one embodiment of our invention in which 1 is a vacuum cylinder having a closed end from which extends arm 44 by which it is hinged at 45 on bracket 43 supported from beam 42, which latter may be a part of the chassis of a motor car. 2 is a piston in cylinder 1 having a cup-leather packing which prevents air passing around it into the cylinder space behind it, but allows air to pass out slowly around it, and 3 is a piston rod extending through cylinder head 1a but not having an air-tight bearing therein. The outer end of said piston rod is pivotally connected to the clutch lever 4 mounted on rotatable shaft 4a and normally pulled toward clutch engaging, or closing, position by a spring such as 5 in the usual way. 6 represents generally the intake-manifold of an internal combustion motor to which the carburetor mixture tube 9 is connected, 10 being the carburetor throttle valve controlled by lever 10a and spring 10b, which latter normally holds one extremity of the valve arms 11a against fixed stop 11, with the valve in adjusted position for idling the motor.

The carburetor throttle is controlled in the usual manner by a lost-motion apparatus composed of the two-part connecting rod, sections 18 and 19 of which are kept in line by tubular clip 16 fast on section 19. Compression spring 17 is confined between clip 16 and a similar one 15 which is fast on rod section 18. The enlarged ends of these clips are split as shown in Figs. 3 and 4, so that each can be clamped down on the supporting rod section by set screws 15a. The other end of this connecting rod is pivoted at 28a to swinging link 19a mounted on a fixed pivot 19b, and also to the accelerator plunger 12 which passes through the foot board 13. A tension spring 14 normally holds the accelerator plunger or pedal in retracted position, as shown in Fig. 1, with a gap between the adjacent ends of the rod sections 18, 19, which gap determines the amplitude of the lost motion.

The closed end of the cylinder 1 is connected by conduit 36 to a port casing 23 which surrounds the casing 7 of the fluid pressure controlling valve and communicates with a plurality of ports 22 in said casing. 37 is a conduit connecting the intake manifold 6 with said valve casing 7 at another point through port 41. The piston valve 8 has a medial portion 26 of reduced diameter which is long enough to bridge ports 22 and 41 when the accelerator pedal 12 is retracted and remains in the position shown in Fig. 1. Conduit 36 is controlled by the three-way valve 24 which may open passage 24a through the conduit when in position shown in Fig. 5, or vent the interior of cylinder 1 to the atmosphere through valve passages 24a, 24b, when said valve is rotated 90° in a clockwise direction. Similarly conduit 37 is controlled by a three-way valve 25 which affords passage therethrough by channel 25a when the parts are in the position shown in Fig. 5, or closes off the connection to the intake manifold and vents the valve casing 7 to the atmosphere when said valve is rotated 90° in a clockwise direction. The two valves are connected so as to be operated in unison by push-rod 25c pivoted to the levers of both valves and extending through the foot board 13 so that it may be manipulated by the operator.

The piston valve 8 has cylindrical enlargements 21, 21, at or near either end, while its right hand extremity tapers slightly, as indicated at 20. It is connected by wrist pin 27 to link 28, the other end of which is connected to pivot 28a which unites it and the accelerator plunger, pedal or rod 12 and the carburetor rod section 19.

The operation of the mechanism shown and hereinbefore described is as follows:

With the foot pressure off the accelerator 12 the spring 14 holds the parts in position, as shown in Fig. 1, which is the idling position of the carburetor and, the manifold 6 being connected by means of pipe 37, ports 41 and 22, the annular space around the valve portion 26 of reduced diameter, and the pipe 36 to the vacuum cylinder 1, the piston 2, rod 3 and clutch pedal 4 will be pulled to the left and all parts held in the clutch-disengaged position so that, with the valve 8 as shown in Fig. 1, the motor vehicle will free-wheel or coast.

To start from a stand-still in low gear a comparatively slow clutch engagement is required while the motor is turning at a moderate speed, for smooth starting, and this is obtained by the tapered portion 20 of valve 8, as this taper graduates the amount of air that can pass, in a given time, from the atmosphere into the cylinder 1 when the accelerator plunger or pedal 12 is pressed down or to the left to a given degree by the foot. The farther the pedal 12 is pressed by the foot the faster the engagement of the clutch will be and the faster the motor will be turning when the clutch engages. When changing from first to second, and from second to high, gear, a rapid clutch engagement is necessary for quick acceleration, and to obtain this rapid clutch engagement the foot accelerator 12 is pressed far enough so that the right hand end of the valve 8 will pass the left hand edge of the ports 22 thus giving the maximum opening between the atmosphere and the cylinder 1 while the motor is revolving at a desirably higher speed. The portions 21 of the valve 8 are of full cylindrical cross section to fit closely in valve casing 7 so as to prevent leakage between the annular space around the valve portion 26 and the atmosphere. In other words the piston valve has the proper amount of lap in relation to the ports 22 and 41. Lost motion is allowed between the parts 18 and 19 of the carburetor throttle rod so that the clutch can be engaged while the carburetor throttle is in the idling position and while the motor is idling. As a result of the hereinbefore described construction the gap between the adjacent ends of throttle rod sections 18 and 19 is open while the operator's foot is off the accelerator pedal 12, and the intake-manifold is then connected to cylinder 1 so that clutch pedal 4 is automatically held in depressed position, causing the power transmission clutch to be held in disengaged position and the carburetor throttle in idling adjustment.

The first movement of accelerator pedal 12 to the left closes ports 22, thus shutting off the suction from the intake manifold 6, and thereafter, as the tapered portion 20 of the valve comes opposite ports 22, it begins to admit air through them from air ports 50 in the right hand end of valve casing 7, and through said ports 22, to the interior of cylinder 1, thus permitting the spring 5 to begin closing the clutch. Further movement of the accelerator rod 12 to the left admits more air to complete the clutch closure and also closes the gap between sections 18 and 19 of the throttle rod and begins to open the carburetor throttle valve 10, so that as the clutch is then completely engaged, thereafter the car may be driven by the motor at any speed determined by further opening of said throttle valve. When the accelerator rod or pedal 12 is allowed to be pulled back by the spring 14, the carbuertor throttle valve is first brought back to idling position and then the final movement of the accelerator pedal to the right closes the connection between ports 22 and the atmosphere and thereafter opens the connection from cylinder 1 through the valve casing 7 to conduit 37, and the suction of the intake manifold then operates on piston 2 to pull the clutch out of engagement. As a result the clutch may be let into engagement before the carburetor throttle begins to open, and, conversely, the clutch can only be pulled out of engagement after the carburetor throttle has been closed.

4a is the clutch-operating shaft to which clutch pedal 4 is keyed. 48 indicates stops fastened in the left-hand end of valve casing 7 to limit the movement of valve 8 in that direction. 49 is an inturned, annular lip at the right-hand end of said valve casing to limit movement of the valve in the other direction. This latter also serves as a stop for the accelerator plunger or pedal 12. A short section of rubber hose 46 is held at one end to conduit 36 by a band clip, as indicated, and at the other end is similarly held to the nipple 47 set in the wall of cylinder 1.

In Fig. 2 a ball and socket connection 40 between valve 8 and its connecting rod 28 takes the place of wrist pin 27 in Fig. 1. Figs. 8 and 9 show a form of butterfly valve designed as an alternative construction for the piston valve shown in Fig. 2. This valve comprises the cylindrical cup-shaped casing 29 in which the butterfly valve 30 is mounted on rotary shaft 35 and held in position by casing head 29a. The valve is oscillated by valve lever 34, the motion of which is limited by stop 33. A port 31 in said casing is adapted to be connected by nipple 36a with conduit 36 of Fig. 1, and 37a is a similar nipple by which the valve casing interior may be connected with suction conduit 37. An air port in said casing is shown at 50. The lower wing of the butterfly valve, which cooperates with port 31, is backed off at the rear edge of its operating face, as indicated at 32, this corresponding to the tapered portion 20 of valve 8. The valve lever 34 being connected to the accelerator pedal through link 28 in the same manner as valve 8 in Fig. 1 is connected, this valve will operate in the same way as the piston valve 8 to open connection between conduits 36 and 37 and apply suction to the interior of cylinder 1, or, when the butterfly valve is rotated in a counterclockwise direction (looking at Fig. 9), it will first close 31, shutting off the suction, and then gradually connect cylinder 1 with air-port 50, as the backed-off portion 32 of the valve comes opposite port 31.

When a more rapid first stage of clutch closing movement is desired the vacuum cylinder can be made double acting as shown in Fig. 6, the taper 20, in this case, being used on the piston heads at both ends of the valve 8. In the position shown in Fig. 6 the intake manifold 6 is connected to the cylinder 1 at the left-hand end of the cylinder 1 and the right-hand end of the cylinder 1 is connected to the atmosphere. When the accelerator 12 is pressed forward by the foot the left-hand end of the cylinder 1 is connected to the atmosphere and the right-hand end of the cylinder 1 is connected to the manifold 6 gradually or suddenly to give a slow or fast clutch enngagement. In other words, the ports are either opened gradually or suddenly to their full area. In Fig. 6 the parts are shown in the positions occupied just after the accelerator 12 has been released from pressure of the operator's foot, and valve 8 has been thereby pulled quickly to the right, but before any vacuum so created in the lefthand end of cylinder 1, or any inflow of air to the righthand end thereof has had time to cause piston 2a to move to the left and open the clutch.

When the space at the right-hand end of cylinnder 1, which will be filled with air during such subsequent movement, is still later connected with the intake manifold by a movement of the accelerator to the left under pressure of the operator's foot, the pull of spring 5, or of other clutch operating springs, swinging lever 4 in a clutch closing direction, causes the piston 2a to travel to the right in said cylinder 1 and such piston movement tends to expel any air in that end thereof through conduit 51, 37, and valve means 7, 8, into the manifold. This flow is controlled by the adjustment of valve 8 which thereby modifies to a greater or less extent the speed of clutch closure according to the degree of such valve opening. The three-way valves 24 and 25 are used to connect both ends of the cylinder 1 with the atmosphere and to connect the left-hand end of the cylinder 1 with the port casing 23 and the right-hand end of the cylinder 1 with the left-hand port casing 52 of the valve casing 7. In this form the piston 2a has a double cup-leather packing and the cylinder head 1b has a flexible lip packing 1c turned inward around piston rod 3 to form an air-tight contact therewith. The connection from the right-hand end of cylinder 1 to valve casing 7 is through conduit 51, port casing 52 and ports 53. The left-hand open end of valve casing 7 forms an air port 50a and the right-hand open end forms an air port 50, the same as in Fig. 1. Figs. 10 and 11 show a form of butterfly valve that can be used for the same purpose as the piston valve shown in Fig. 6. When this form of valve is substituted in Fig. 6, conduit 51 will be connected to nipple 51a, which takes the place of valve casing 52 in Fig. 6 and opens into the valve port 53 with which the upper wing of the butterfly valve 30 (Fig. 11) cooperates, said valve face having a backed-off portion 32a. When the parts are in the position shown in Fig. 11, the suction through conduit 37 is shut off from both ends of the cylinder 1. If the valve 30 is rotated in a clockwise direction until its operating lever 34 comes up against stop 33, the conduit 36, which is connected to nipple 36a, will be subjected to suction through the opened valve port 31 and the other end of the cylinder will be vented to the atmosphere, as port 53 is opened by the upper valve wing and thrown in connection with air port 50. If, on the other hand, the valve 30 is rotated in a counterclockwise direction, the right-hand end of the cylinder 1 is gradually subjected to suction as port 53 is opened and thrown in connection with conduit 37. At the same time the other end of the cylinder is vented to the atmosphere through ports 31 and 50.

Fig. 6 also shows another means for ensuring the proper amount of lag in the opening of the carburetor throttle after the valve 8 has so distributed the fluid pressure as to close, or permit the engagement of the clutch. In the arrangement there shown the outer end of throttle rod 18 is pivoted at 16b to the free end of link 16a which swings about fixed pivot 16c in the same plane in which the adjustable tappet 19x, carried by link 19a, swings. When the accelerator pedal 12 is free and the parts are in the position shown in Fig. 6, the gap between 19x and 16a corresponds to that between the ends of throttle rod sections 18 and 19 in Fig. 1. Not until after the accelerator pedal and valve 8 have been pushed far enough to the left to close off the suction from the left side of piston 2a and apply it to the right side thereof to begin to close the clutch, will 19x strike 16a and then begin to open the throttle.

The cut-out valves 24 and 25 in Fig. 6 are not connected together. Consequently either can be slightly turned, if desired, to partly throttle the suction on the corresponding end of cylinder 1, and so slow down the rate of piston motion thereby created. When both 24 and 25 are turned through 90° the suction is wholly cut off and both ends of cylinder 1 (in Fig. 6) are vented to the atmosphere.

Figure 7:
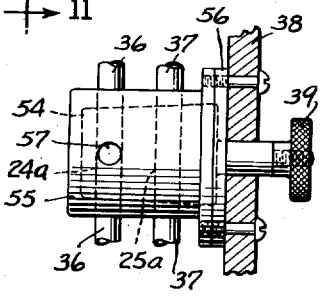
Fig. 7 is a detail side view of a modified form of single cut-out valve adapted for installation on the instrument board of the motor car.

The same result is accomplished by the one double cut-out valve shown in Fig. 7, where 54 is a plug valve having two through-passages, 24a and 25a, registering respectively with conduits 36 and 37 (in the same manner as shown in Fig. 5). The valve casing 55 and cover 56 are held by screws to the instrument board 38, through a hole in which the knurled head 39 of the valve spindle projects. 57 is an air port in this valve casing with which one end of valve passage 24a will register when the valve is rotated 90° (also as shown in Fig. 5). The conduits 36 and 37, which are formed of flexible copper tubing, are then made long enough to loop up to the valve casing 55 on the instrument board as illustrated in Fig. 12, and consequently this one valve does the work of the two connected valves 24 and 25 shown in Figs. 1 and 5. That is to say, it keeps open the connections from manifold 6 to valve port 41 and from port casing 23 to cylinder 1, when the parts are in the normal position indicated in Fig. 7, but, when turned 90°, it closes all passage through conduit 37, and opens 36, and through 36 the interior of cylinder 1, to the atmosphere. This disables the clutch-operating power mechanism and leaves the clutch free for operation by the driver's foot in the usual manner, as though our invention had not been applied to the car. This is the main purpose of all the cut-out valves 24, 25 and 54. Some form of cut-out of the character above described is required by law on every free-wheeling attachment in many states. In this valve no air port is shown for venting the portion of conduit 37 that extends to the valve casing 7 as it really is not necessary to vent the valve. When valve 8 has been cut off from connection with both intake manifold 6 and cylinder 1, it can reciprocate freely with the dead air trapped in its casing 7.

The purpose of the short lengths of rubber hose 46, 46, shown in Figs. 1 and 6 is to permit the cylinder 1 to swing slightly on its pivot mounting at 45, as is rendered necessary by the angularity of clutch pedal lever 4.

Mounting the power cylinder 1 on a swinging pivot 45, simplifies the piston rod connections and also makes it easy to install the apparatus on any make of car by merely providing a special bracket 43 that can be attached to the most convenient adjacent portion of the chassis or steering post, or motor base of the car.

Obviously any mechanism for automatically disengaging and engaging a clutch which is used for transmitting power from an internal combustion motor of the four-cycle type such as is generally used on motor cars should include means for producing a gradual, as distinguished from a sudden, engagement between the members of the friction clutch usually employed for connecting the freely revolving motor to the running gear of the car, which may be at rest or moving at a speed differing from that of the motor. This is necessary because such type of motor will not start under load and the clutch has to be engaged after the motor has been started, so that any sudden, and/or quickly completed clutch engagement would necessarily be accompanied by unpleasant and injurious shocks resulting from sudden acceleration of the car, or a sudden checking of the motor speed, or both.

In the standard make of motor cars the clutch-controlling mechanism already installed is normally biased, as by the spring 5 here shown, to close the clutch. Consequently any power-operated mechanism for actuating the clutch is required to exert power only while opening the clutch, and then, after the power application is ended, the biased, spring-operated clutch-control mechanism will cause a clutch closure modified as to rapidity by the drag of the dead servo-motor, which is connected to it.

Also, while a predetermined degree of decrease of speed of approach by the movable element of the clutch toward its cooperating, axially non-movable, element during such clutch closing movement can be secured by the use of automatic mechanism, combined with the main clutch-actuating apparatus or servo-motor such as here shown, it is always desirable that such speed of engagement should be at least partly under manual control by the driver, as hereinbefore explained, since he can sense the particular conditions then existing and consequently more accurately graduate the rate of clutch engagement needed to avoid shock and "grabbing" on the one hand, or slipping and burning of the clutch on the other hand, and therefore can more successfully accomplish starting of the car and gear shifting than can any purely automatic apparatus. Also, the operator can sense any incipient shock developing as such automatic device is producing the initial clutch engagement, and thereupon immediately modify the same in a manner necessary to avoid further aggravation of such incipient jerking, clutch "grabbing" phenomena.

If the power unit, or servo-motor, employed for actuating the clutch lever is a pneumatic motor, the type we have here shown and described as embodying one form of our present invention, such slowing down of the clutch-engaging operation involves control of the rate of inflow of air to the vacuum chamber of such motor, in this case the left-hand end of cylinder 1, or control of the outflow of air from an air-cushion space, in this case the right hand end of such cylinder if the latter is made substantially air-tight as shown in Fig. 6.

This control of inflow and/or outflow is best effected by a valve capable of accurately graduated adjustments of opening and closing of the air passages to and from the pneumatic motor. This adjustment may be secured by the use of a tapered valve portion such as the parts marked 20, or 20*a* of the valve apparatus shown in Figs. 1, 2 and 6, but obviously other forms of valve or valve apparatus could be designed to produce this effect. All that is needed is some kind of a valve under control by the operator and acting to bleed the air out of an air-cushioning chamber which slows the clutch-engaging movement at an accurately graduated rate, as does the tapered valve extension 20*a* in Fig. 6, or to similarly bleed the air into a vacuum chamber, such as the left-hand end of cylinder 1, any remaining slight vacuum in which slows the clutch-engaging movement. Such graduated admission of air is controlled by the tapered valve extension 20 in Figs. 1 and 6.

It is always important, however, that the main valve apparatus, or the functioning of that portion of the valve apparatus which alternately connects such pneumatic motor with the intake-manifold and the atmosphere, should completely close the manifold connection before the air inlet to the interior of the pneumatic motor is opened, and that control of any bleed action from the compression space in a servo-motor having a cylinder closed at both ends should be effected by extraneous means, since otherwise there will be either a momentary sucking of an excess of air into the intake-manifold while the motor is still idling, which will render the mixture momentarily so lean that the motor of the car will stall, or some other interference with efficient operation of the apparatus. It is also important that the connection from accelerator 12 to the throttle should include a lost-motion device, as before explained, so that the accelerator will sequentially operate the vacuum control valve and the throttle valve.

All these above described conditions and requirements are fully met in the piston type of valves and valve apparatus hereinbefore described and shown in the drawings, in that each such valve piston has its full bodied section long enough to produce the proper amount of lap with respect to its cooperating valve port. Also the controlling means afforded by the tapered portion 20*a* of the valve piston shown in Fig. 6 for controlling the escape of air from the compression end of cylinder 1 is relatively remote from the suction-controlling valve piston 21, 20 and extraneous of the latter. These requirements should also be met in any equivalent valve apparatus which may be substituted for the preferred forms we have here shown in detail.

Other forms of pneumatic motors, or pneumatic servo-motors, might be substituted for the cylinder and piston type thereof which we have herein shown, so long as such modifications come within the scope of our invention as defined in the appended claims.

Various changes could be made in the details of the constructions here shown without departing from the underlying principles of the invention. Thus the parts could be reversed so as to operate by fluid pressure above atmosphere derived from the exhaust manifold, instead of by the sub-atmospheric pressures derived from the intake manifold.

Also, while in the modification shown in Fig. 6 the conduit 51, 37, connecting that end of the servomotor cylinder 1 through which its piston rod 3 protrudes with the intake manifold 6 and the valve means 7, 8, controlling said conduit, lie wholly outside of said cylinder, equivalent elements of the combination might be differently located, so long as the valve means comprise an element subject to manual adjustment to control the flow of air from said cylinder end; whereby clutch closing movements of piston 2a toward that end may be correspondingly controlled.

Having now fully described our invention what we claim is:

1. A vacuum power clutch mechanism having, in combination, a cylinder pivotally connected to the frame of the motor vehicle, a piston in said cylinder, a piston rod connected to said piston, a clutch pedal, means for connecting said piston rod to said clutch pedal, said piston rod working through a head in said cylinder, said head having means cooperating with said piston rod to prevent air from leaking into or out of said cylinder, a valve casing having ports connected by passageways to said cylinder, a valve in said valve casing having part of its periphery in the form of a full bodied section and part of its periphery tapered, an intake-manifold connected by a passageway to said valve casing, a second pedal pivotally connected to said valve, a carburetor, having a throttle valve, said carburetor throttle valve being also operatively connected to said second pedal and means for allowing said first mentioned valve to be moved before said carburetor throttle valve is moved from the idling position.

2. In a pneumatic apparatus for actuating the clutch lever of a motor car, the combination, with such clutch lever, of a cylinder having a substantially air-tight closed end, a piston in said cylinder having a piston rod extending through said cylinder end and connected to said lever, a conduit connected to the interior of the closed end of said cylinder, and a valve apparatus controlling passage through said conduit comprising a valve casing having a port to which such conduit is connected and a valve piston having a sliding fit in said casing and also having a relatively considerable portion of its length of a slightly tapering cross section adapted to cooperate with said port during a portion of its travel; whereby the flow of air from said closed end of the cylinder may be regulated by adjustment of such valve piston with reference to said port.

3. A pneumatically operable mechanism for controlling the clutch lever of a motor car comprising, in combination, a cylinder having a piston therein with a piston rod extending through, and having a substantially airtight bearing in, one head of said cylinder and adapted to be connected to a clutch lever, a tubular valve casing having a connection to the intake manifold, separate conduits connecting either end of said cylinder to separate ports in said valve casing, and a valve member movable endwise in said casing and adapted by its motion alone to open said ports to their full widths or to close them, thereby opening, closing or partially restricting communication from said manifold to that end of the cylinder opposite that through which said piston rod extends, and also the air inlet to and outlet from the other end of said cylinder; whereby any vacuum existing in said intake manifold may be utilized to move said piston in one direction and its movement in the other direction may be controlled by graduating the degree of port opening for the conduit connected to said last mentioned cylinder end substantially as described.

4. An apparatus such as defined in claim 3, combined with a throttle controlling member also operatively connected to said valve member so as to open the said manifold connection after the throttle has been closed and to close the manifold connection before the throttle is opened.

5. A pneumatically operable mechanism for controlling the clutch of a motor car comprising, in combination, a cylinder having a piston rod extending through, and having a substantially air-tight bearing in, one head of said cylinder and adapted to be connected to a clutch lever, a valve casing having a connection to the intake manifold of the motor from a point approximately midway of the length of said casing, separate conduits connecting either end of said cylinder with separate ports in said valve casing which are located on either side of said manifold connection and a double piston valve each head of which has a part of its length in the form of a full bodied section and another part tapering, said valve being adapted to slide in said casing and thereby open communication from said manifold connection to either one of said conduits, said valve casing having an opening to the atmosphere at either end.

6. A combination such as defined in claim 5 in which one of said tapered valve sections extends toward the said manifold connection, while the other extends toward the nearest casing opening to the atmosphere.

7. A combination such as defined in claim 5 in which each said full bodied valve section has a length at least as great as the width of its cooperating port; whereby said valve member is capable of simultaneously lapping both said conduit ports and said first mentioned piston may thereby be held in any position which it may then have reached in its travel in said cylinder.

8. In a pneumatic apparatus for actuating the clutch lever of a motor car having an internal combustion motor of the compression type and a manually operable accelerator for controlling the speed of such motor, the combination, with said clutch lever, of a servo-motor comprising a cylinder having substantially air-tight closed ends one of which is connected to the intake manifold of said car motor, a piston in said cylinder having a piston rod extending through the other of said cylinder ends and connected with said lever, a conduit connected to the interior of the last mentioned end of said cylinder, and a valve apparatus controlling passage through said conduit, said valve apparatus being operated by a connection to said accelerator; whereby the flow of air from said end of the cylinder through said conduit may be regulated by the adjustment of said accelerator.

9. A vacuum-power clutch-actuating mechanism having, in combination, a cylinder connected to the frame of a motor vehicle, a piston in said cylinder, a piston rod connected to said piston, a movable clutch-actuating member, means for connecting said piston rod to said member, an intake manifold, a valve apparatus for controlling the movement of said piston comprising a valve casing having ports, one of which is connected to said cylinder and another to said intake manifold, together with an opening to the atmosphere, and a valve in said casing adapted either to connect said ports one with the other, or to close the port connected to the intake manifold before connecting said other port with the atmosphere, a second movable member operatively connected to said valve, and a carburetor having a throttle valve also operatively connected to said second movable member, said valve apparatus having means adapted to minutely graduate the rate of flow of air set in motion by movements of said piston.

10. A combination such as defined in claim 9 in which said valve operating connection permits air to be admitted to said cylinder to cause a clutch closing movement of said clutch-actuating member before the opening of said throttle is begun.

11. In an automotive vehicle having a clutch-operating mechanism normally biased to close the clutch, the combination of a vacuum-operated servo-motor having a cylinder closed at both ends, said servo-motor being operably connected to said mechanism, and a manually operable valve apparatus for producing alternately an eduction of air from, and admission of air to, the suction end of said cylinder to initiate the clutch disengaging and engaging operations of said mechanism, said valve apparatus also comprising an element for accurately graduating the outflow of air from the other, non-suction end of said motor cylinder and thereby similarly regulating the clutch-engaging operations of said mechanism.

12. An apparatus such as defined in claim 11 combined with a speed-controlling device for said vehicle and an operative connection by means of which said device also controls said valve apparatus.

13. In an automotive vehicle equipped with a movable clutch-actuating member, an internal combustion motor of the four-cycle type, a throttle valve therefor, a device controlling said throttle valve, a vacuum motor having a vacuum connection to the intake manifold of said first mentioned motor and an operative connection to said clutch-actuating member, said vacuum connection having a valve for closing it and thereafter admitting air to said vacuum motor to permit said member to effect a clutch-closing movement, the combination, with said above described apparatus of means extraneous of said last mentioned valve and controlled by said throttle-operating device for more accurately graduating such clutch-engaging movement of said member.

14. A combination such as defined in claim 13 in which said means comprises a bleed valve operable by said throttle-controlling device.

15. A combination such as defined in claim 13 in which said throttle-controlling device sequentially actuates said vacuum-controlling valve and said throttle valve.

16. In a clutch control mechanism having a clutch controlling member, a double-ended fluid motor having a movable element operatively connected with said member, a control valve for said motor and connections interconnecting each end of said motor with said valve, said valve comprising a one-piece casing and a one-piece reciprocable valve member mounted for sliding movement within said casing, said latter member, being provided with a tapered portion for variably determining the mode of efflux of air from said motor depending upon the position of said valve member and thereby accurately graduating the clutch-engaging movement of said clutch controlling member.

17. In a pneumatic apparatus for actuating the clutch controlling member of a motor car, which said apparatus is connected to the intake manifold of such car, a valve apparatus for controlling said connection and for admitting air to said pneumatic apparatus only after said manifold connection has been temporarily closed, which said valve apparatus comprises, in combination, means for quickly opening said manifold connection and air bleed means for accurately graduating the clutch closing movement of said member, said penumatic apparatus including a substantially closed air chamber in which air is compressed during the latter portion of the clutch closing movement of said clutch controlling member, and in which said air bleed means controls the outflow of air from said chamber.

18. In a pneumatic apparatus for actuating the clutch controlling member of a motor car, which said apparatus is connected to the intake manifold of such car, a valve apparatus for controlling said connection and for admitting air to said pneumatic apparatus only after said manifold connection has been temporarily closed, which said valve apparatus comprises, in combination, means for quickly opening said manifold connection and air bleed means for accurately graduating the clutch closing movement of said member, said pneumatic apparatus including a substantially closed air chamber in which air is compressed during the latter portion of the clutch closing movement of said clutch controlling member, and in which said air bleed means controls the outflow of air from said chamber, combined with an operative connection from said valve apparatus to the accelerator pedal of such car.

19. In an automotive vehicle having a clutch mechanism and a clutch return spring, a vacuum operated double-ended fluid motor operably connected to said mechanism, a manually operable valve for controlling the eduction and admission of air to the one side of the motor to initiate the disengaging and engaging operations of the clutch mechanism, and a second manually operable valve simultaneously operable with the first valve for controlling the eduction of air from the other side of the motor to control the operation of the clutch return spring in regulating the clutch engaging operation of said clutch mechanism.

20. An automotive vehicle provided with an internal-combustion engine, a throttle for said engine, and a clutch mechanism, a double-ended pressure differential operated motor operably connected with the clutch mechanism, a valve unit for controlling the gaseous pressure within both ends of the motor, and common manually operable means for operating both the throttle and the valve unit to control both the clutch disengaging and engaging operations of said motor and the operation of the internal-combustion engine.

21. An automotive vehicle provided with an internal-combustion engine, a throttle therefor, an accelerator, a clutch mechanism, and comprising in combination therewith a double-ended vacuum operated motor operably connected with the clutch mechanism, valve means for controlling the gaseous pressure within one end of said motor, and other valve means for controlling the gaseous pressure within the other end of the motor, both of said valve means and said throttle being operated by said accelerator.

22. An automotive vehicle provided with an internal-combustion engine and a clutch mechanism, a throttle for said engine, and an engine operated double-ended vacuum motor operably connected with the clutch mechanism, a valve unit for controlling the operation of the motor, said unit comprising a three-way valve associated with one end of said motor and a bleed valve associated with the other end of said motor, and common means for operating the throttle, the three-way valve and the bleed valve.

23. A combination such as defined in claim 9 in which the means adapted to minutely graduate the rate of flow of air set in motion by movements of said piston comprises an inclined valve portion cooperating with a port to control passage of air between said cylinder and the intake manifold.

24. A combination such as defined in claim 9 in which said last named means is adapted to minutely control the flow of external air to the interior of said cylinder during at least a portion of the period of the clutch-closing movement of said clutch-actuating member.

25. In a clutch actuating apparatus for motor cars the combination, with a reciprocable member for opening and closing the clutch and a gas engine having an intake manifold in which varying degrees of vacuum exist according to running conditions, of a vacuum actuated servomotor comprising a cylinder having closure heads at both ends and a connection from one end to said manifold, a piston reciprocable in said cylinder having a rod extending through the head at the other cylinder end and connected to said reciprocable member, and valve means for controlling any flow of air from said last mentioned cylinder end to said manifold having an adjustable element participating in said flow control together with a manually controllable device operatively connected to said adjustable element which is separate from, and devoid of operative connections with, the hereinbefore mentioned reciprocable member for opening and closing the clutch; whereby movements of said piston toward said last mentioned cylinder end may be correspondingly controlled.

26. A combination such as defined in claim 25 in which said manually controllable device is provided with connections enabling it to also serve as an accelerator for controlling the speed of said gas engine.

27. A combination such as defined in claim 25 in which said adjustable valve element also participates in the control of any inflow of air to said last mentioned cylinder end.

HENRY JOHN DE NEVILLE McCOLLUM.
JAMES HARRY KEIGHLEY McCOLLUM.